(12) United States Patent
Jang et al.

(10) Patent No.: US 8,880,900 B2
(45) Date of Patent: Nov. 4, 2014

(54) MEMORY SYSTEM

(75) Inventors: Hyoung-Suk Jang, Gwangmyeong-si (KR); Hee-Chang Cho, Seoul (KR); Min-Wook Kim, Hwasung (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 104 days.

(21) Appl. No.: 13/599,035

(22) Filed: Aug. 30, 2012

(65) Prior Publication Data

US 2013/0117566 A1 May 9, 2013

(30) Foreign Application Priority Data

Nov. 8, 2011 (KR) .................. 10-2011-0115904

(51) Int. Cl.
*G06F 11/30* (2006.01)
*G06F 21/34* (2013.01)

(52) U.S. Cl.
CPC ........ *G06F 21/34* (2013.01); *G06F 2221/2107* (2013.01); *G06F 2221/2103* (2013.01)
USPC ........... 713/189; 713/190; 713/191; 713/192; 713/193

(58) Field of Classification Search
CPC ........................... H04L 9/3236; H04L 9/3234
USPC .................................................. 713/189–193
See application file for complete search history.

(56) References Cited

U.S. PATENT DOCUMENTS

| | | | |
|---|---|---|---|
| 8,255,691 B2 * | 8/2012 | Yi et al. ........................ | 713/176 |
| 8,281,362 B2 * | 10/2012 | Nagata et al. .................... | 726/2 |
| 8,504,839 B2 * | 8/2013 | Krig ............................ | 713/176 |
| 2007/0061572 A1 * | 3/2007 | Imai et al. ...................... | 713/169 |
| 2007/0083704 A1 | 4/2007 | Watanabe et al. | |
| 2009/0282268 A1 * | 11/2009 | Durham et al. ................ | 713/193 |
| 2010/0083001 A1 * | 4/2010 | Shah et al. ..................... | 713/187 |
| 2010/0115184 A1 * | 5/2010 | Chang ........................... | 711/103 |
| 2010/0268953 A1 | 10/2010 | Matsukawa et al. | |
| 2010/0275036 A1 | 10/2010 | Harada et al. | |
| 2011/0162082 A1 * | 6/2011 | Paksoy et al. ................... | 726/26 |
| 2012/0079283 A1 * | 3/2012 | Hashimoto et al. ........... | 713/189 |
| 2012/0216037 A1 * | 8/2012 | Simcoe et al. ................ | 713/168 |

FOREIGN PATENT DOCUMENTS

KR 1020070076848 A 7/2007

OTHER PUBLICATIONS

Dwoskin, et al. "A Framework for Testing Hardware-Software Security Architectures," ACSAC '10: Proceedings of the 26th Annual Computer Security Applications Conference. pp. 387-397.*

Taylor et al. "A simulation-based method for the verification of shared memory in multiprocessor systems," Computer Aided Design, 2001. ICCAD 2001. IEEE/ACM International Conference on pp. 10-17.*

* cited by examiner

*Primary Examiner* — Luu Pham
*Assistant Examiner* — Roderick Tolentino
(74) *Attorney, Agent, or Firm* — Volentine & Whitt, PLLC

(57) ABSTRACT

A memory system comprises: a memory device including an authentication data area storing authentication unit information and a verification value, and a contents data area storing contents; and a host device configured to receive the authentication unit information and the verification value from the memory device, and perform secure authentication of the memory device based on whether a result of decoding the verification value is equal to the authentication unit information.

16 Claims, 9 Drawing Sheets

MEMORY SYSTEM

CROSS-REFERENCE TO RELATED APPLICATION

This application claims priority from Korean Patent Application No. 10-2011-0115904 filed on Nov. 8, 2011 in the Korean Intellectual Property Office, and all the benefits accruing therefrom under 35 U.S.C. 119, the contents of which in its entirety are herein incorporated by reference.

BACKGROUND

1. Field of the Invention

The present invention relates to a memory system.

2. Description of the Related Art

Various types of storage devices are known. For example, a memory card using a flash memory as a storage means, and a universal serial bus (USB) memory which can be connected to a USB port, have been introduced. Further, a solid state drive (SSD) has been recently introduced and is increasingly being used. The size of a storage device is gradually reduced while the storage capacity increases. Storage devices are also being implemented with an interface which allows them to be attachable and detachable to and from a host device. Accordingly, the mobility of the storage device is gradually increased. For example, even in a hard disk which is currently regarded as one of the least expensive storage devices, an external hard disk has been introduced to provide mobility unlike a typical hard disk which is fixed in a personal computer.

Besides the storage device, the host device connected to the storage device to consume the contents stored in the storage device is also being miniaturized, and a portable host device is widely used. As described above, as digital contents stored in the storage device are available anytime and anywhere, a distribution method of contents is being changed to a method in which the contents are distributed in the form of digital data.

Meanwhile, a conventional authentication concept for a memory device generally has been focused on whether a host device has the authority to use a memory device. However, there may be a case where it is necessary to authenticate whether a memory device is a legitimate device that can be used by a host device, e.g., a case of identifying whether it is a memory device wherein a related fee has been normally paid to a particular agency to authorize access to the contents of the memory device.

SUMMARY

The present invention provides a memory system capable of authenticating whether a specific memory device is a legitimate memory device for use.

The objects of the present invention are not limited thereto, and the other objects of the present invention will be described in or be apparent from the following description of the embodiments.

According to an aspect of the present invention, there is provided a memory system comprising: a memory device including an authentication data area storing authentication unit information and a verification value, and a contents data area storing contents; and a host device configured to receive the authentication unit information and the verification value from the memory device, to determine whether a result of decoding the verification value matches the authentication unit information, to authenticate the memory device when the result of decoding the verification value matches the authentication unit information, and to not authenticate the memory device when the result of decoding the verification value does not match the authentication unit information.

According to another aspect of the present invention, there is provided a memory system comprising: a first memory device storing first authentication unit information and a first verification value; a second memory device storing second authentication unit information and a second verification value; and a host device configured to receive the first authentication unit information and the first verification value from the first memory device, and to perform authentication of the first memory device based on whether a result of decoding the first verification value matches the first authentication unit information, and further configured to receive the second authentication unit information and the second verification value from the second memory device, and to perform authentication of the second memory device based on whether a result of decoding the second verification value matches the second authentication unit information.

According to yet another aspect of the invention, an apparatus comprises: a memory device having: a contents data storage area storing contents, and an authentication data storage area for authenticating the contents. The authentication area includes: a first area storing therein authentication unit data, and a second area storing a verification value obtained by encoding at least one of: (1) the authentication unit data, and (2) a hashed value obtained by hashing the authentication unit data.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The same reference numbers indicate the same components throughout the specification. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Figure 1:
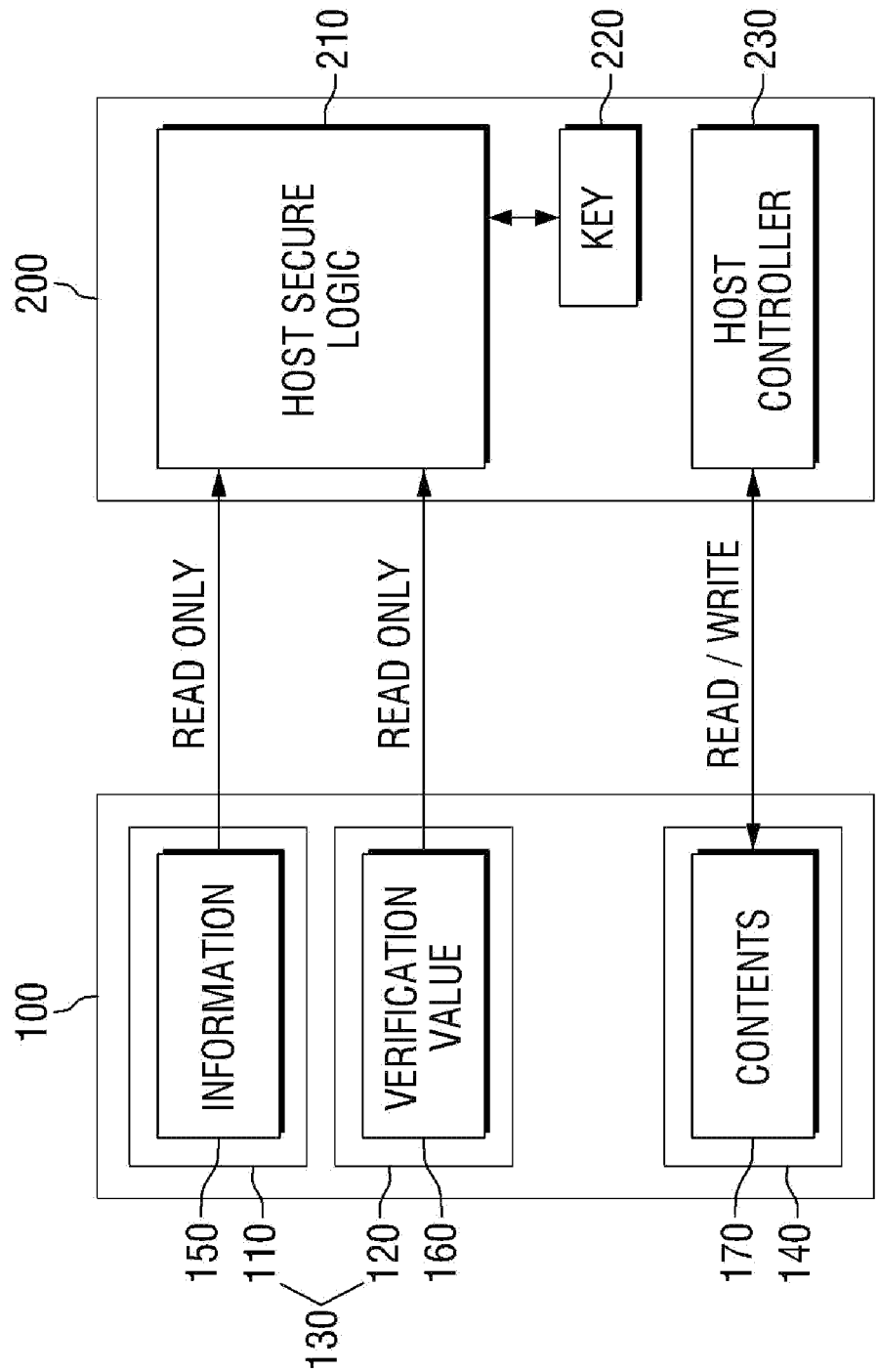
FIG. 1 is a block diagram of one embodiment of a memory system n.

FIG. 1 is a block diagram of one embodiment of a memory system.

Referring to FIG. 1, the memory system includes a memory device 100 and a host device 200.

Memory device 100 may include an authentication data area 130 and a contents data area 140. Contents data area 140 may store various contents therein. Here, the contents may mean data digitally stored in contents data area 140, e.g., music, video, document, image, computer program, and the like.

Authentication data area 130 may include a first area 110 and a second area 120. In this embodiment, first area 110 and second area 120 may have read-only characteristics. In other words, in this embodiment, host device 200 which accesses first area 110 and second area 120 only may read the data stored in first area 110 and second area 120, but may not write or store new data in first area 110 and second area 120.

Authentication unit information 150 is stored in first area 110. In this embodiment, authentication unit information 150 may be information used to authenticate whether the memory device 100 is a legitimate device for use. Authentication unit information 150 may be, e.g., a product identifier of memory device 100, but is not limited thereto.

A verification value 160 is stored in second area 120. Verification value 160 may be used together with authentication unit information 150 to authenticate whether memory device 100 is a legitimate device for use.

Meanwhile, although authentication data area 130 is divided into first area 110 and second area 120 separated from each other in FIG. 1, other embodiments may not be limited thereto. Authentication data area 130 may consist of one area (not shown) if necessary, and both the above-described authentication unit information 150 and verification value 160 may be stored in that one area (not shown).

As described above, since the information regarding the authentication of memory device 100 is stored in authentication data area 130 and contents 170 are stored in contents data area 140, a security level of authentication data area 130 may be higher than that of contents data area 140. For example, if contents data area 140 assigns both read and write authorities to host device 200 interfacing therewith, authentication data area 130 may assign only a read authority to host device 200 interfacing therewith.

Host device 200 interfaces with memory device 100 through a specific interface. The interface between host device 200 and memory device 100 may be an interface in a general-purpose data communication mode, e.g., serial peripheral interface (SPI), universal serial bus (USB), AT attachment (ATA), Serial ATA (SATA) or integrated drive electronics (IDE), but is not limited thereto.

The reason that host device 200 interfaces with memory device 100 through a specific interface may be to consume contents 170 stored in contents data area 140 of memory device 100. Here, consuming contents 170 stored in memory device 100 by host device 200 may mean displaying or printing contents 170 in the form of an image and/or document, playing back contents 170 in the form of music and video, and installing or executing contents 170 in the form of an application such as a computer program.

In this embodiment, before host device 200 consumes contents 170 stored in memory device 100, it is necessary to authenticate whether memory device 100 is a legitimate memory device for use. For example, there may be a case where after authenticating whether memory device 100 is a device having a specific license, host device 200 needs to consume contents 170 for memory device 100 having passed the authentication.

In this case, host device 200 needs to consume contents 170 stored in memory device 100 after authenticating whether memory device 100 is a device having a legitimate license based on the information stored in memory device 100.

To this end, in this embodiment, host device 200 may receive authentication unit information 150 and verification value 160 from memory device 100, and perform secure authentication (e.g., authenticate whether it is a device having a legitimate license) for memory device 100 based on whether the result of decoding (e.g., decrypting) verification value 160 matches or is equal to authentication unit information 150. A detailed description thereof will be described later while describing an operation of the memory system in accordance with the embodiment of the present invention.

Host device 200 may include a host secure logic circuit 210 and a host controller 230. Host secure logic circuit 210 may be a circuit used to authenticate whether memory device 100 is a legitimate device. Host controller 230 may be responsible for various control functions associated with consumption of contents 170 stored in memory device 100.

Meanwhile, host device 200 may store a key 220 associated with the authentication of memory device 100 in a separate storage. Key 220 may be used when host secure logic circuit 210 performs secure authentication of memory device 100.

Although host secure logic circuit 210 and host controller 230 of host device 200 are illustrated as separate blocks to perform different functions in FIG. 1, in other embodiments, if necessary, host secure logic circuit 210 and host controller 230 of host device 200 may be configured as one circuit (not shown) responsible for all their functions.

Further, although a case where key 220 is stored in a separate storage included in the host device 200 has been illustrated in FIG. 1, other embodiments are not limited thereto. Key 220 may be provided from a separate external device (not shown) when the authentication of memory device 100 is performed, without being stored in host device 200.

Hereinafter, the operation of an embodiment of a memory system will be described in detail with reference to FIGS. 1 and 2.

Figure 2:
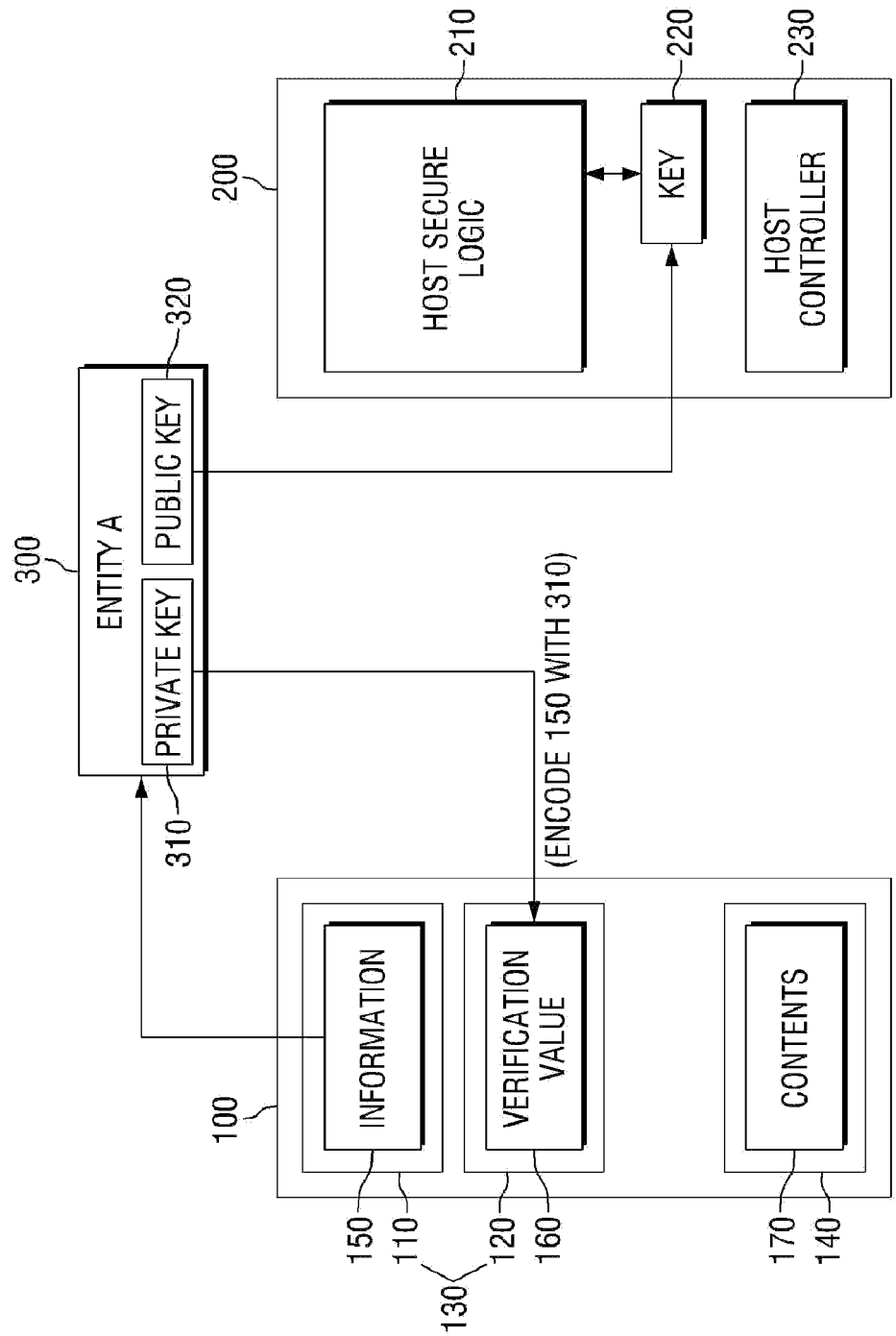
FIG. 2 is a diagram for explaining an operation of the embodiment of the memory system shown in FIG. 1.

FIG. 2 is a diagram for explaining an example operation of memory system 100.

First, referring to FIG. 2, authentication unit information 150 to be stored in memory device 100 is provided to a management entity 300 at a specific time point (e.g., a time point of manufacturing memory device 100). In this embodiment, management entity 300 may be, e.g., a license company. The license company performs management associated with the license only for memory device 100 having entered into a license agreement with the company. Accordingly, in the position of a user who intends to consume contents 170 while paying a license fee to the license company, it is necessary to check whether memory device 100 interfacing therewith is a device having a legitimate license before consuming contents 170. To this end, a manufacturing company of memory device 100 provides authentication unit information 150 to be stored in memory device 100 to management entity 300 at a specific time point (e.g., a time point when memory device 100 is manufactured). Authentication unit information 150 may be, e.g., a product identifier of memory device 100.

Upon receipt of authentication unit information 150, management entity 300 encodes (e.g., encrypts) authentication unit information 150 using its own private key 310, and provides the result to the manufacturing company of memory device 100 as verification value 160. Here, private key 310 is a key owned by only management entity 300 without being leaked out.

Meanwhile, management entity 300 provides a public key 320, which is used to decode (e.g., decrypt) verification value 160 provided to the manufacturing company of memory device 100, to a user who has paid the license fee. Accordingly, public key 320 provided from the management entity 300 may be stored in a specific area of host device 200 operated by the user.

Referring again to FIG. 1, when host device 200 interfaces with memory device 100 in order to consume contents 170, first, host device 200 receives, from memory device 100, authentication unit information 150 and verification value 160 respectively stored in first area 110 and the area 120 of tmemory device 100. In this case, since host device 200 has only a read authority for first area 110 and second area 120, host device 200 only can read verification value 160 from memory device 100, but cannot update the value or store a new value therein.

Then, host device 200 decodes (e.g., decrypts) verification value 160 using key 220. If the decoding result matches or is equal to authentication unit information 150, since memory device 100 is a device having a license acquired legitimately through management entity 300, it is authenticated that memory device 100 is legitimate device.

If the authentication of memory device 100 is completed, host device 200 consumes contents 170 stored in contents data area 140 of memory device 100 under the control of host controller 230. In this case, since host device 200 has read and write authorities for contents data area 140, host device 200 may read and update contents 170, and also may store new contents in memory device 100.

As described above, in this embodiment, host device 200 may authenticate whether memory device 100 is a legitimate device through public key infrastructure (PKI). However, other embodiments may operate differently. Hereinafter, a memory system in accordance with another embodiment will be described with reference to FIG. 3.

Figure 3:
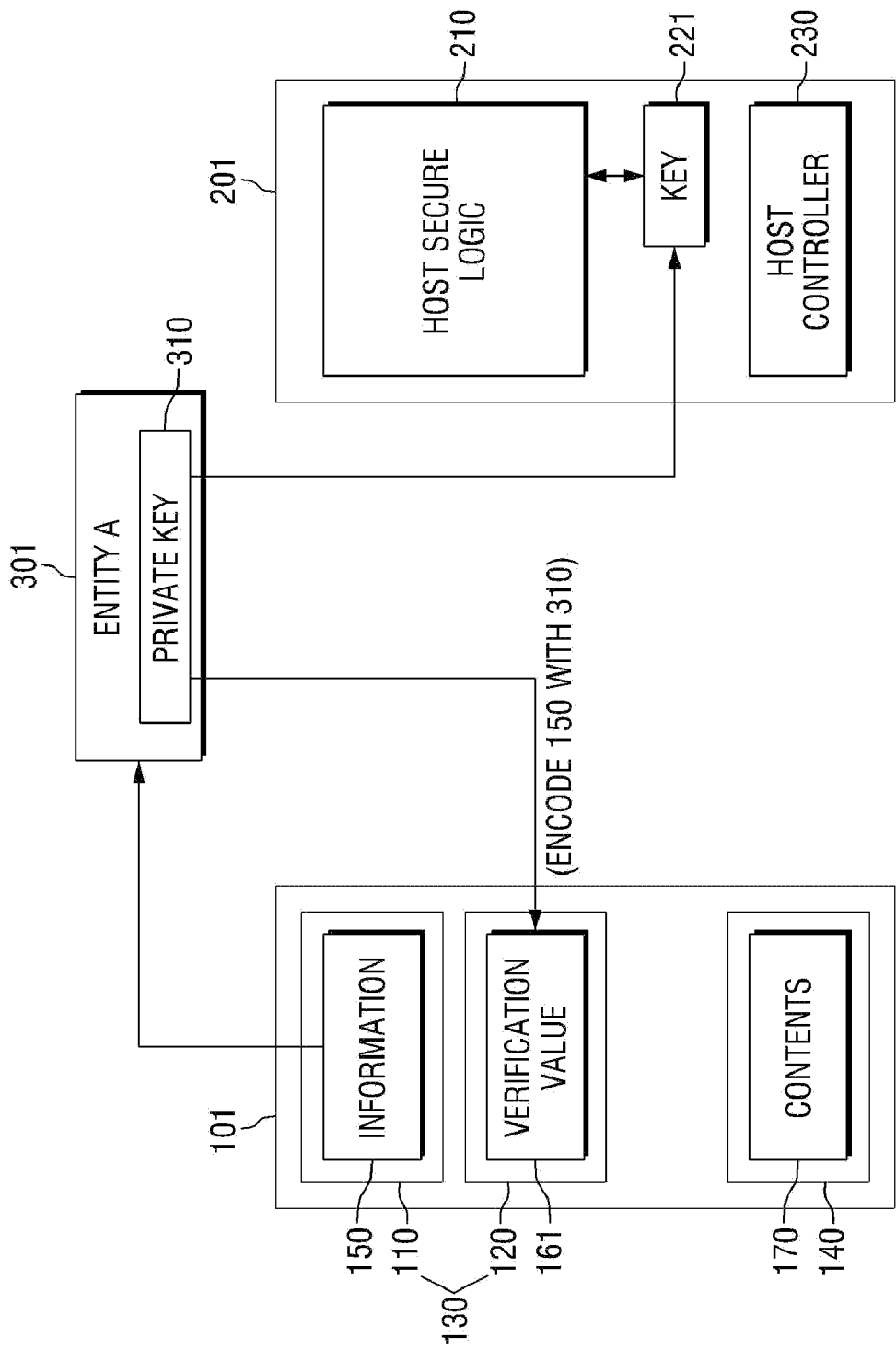
FIG. 3 is a diagram for explaining an operation of another embodiment of a memory system.

FIG. 3 is a diagram for explaining an operation of another embodiment of a memory system. A repeated description of the same configuration as that of the above-described embodiment of FIG. 2 will be omitted and the following description will be made focusing on the differences.

Referring to FIG. 3, a management entity 301 may possess only private key 310 unlike the above-described embodiment. In this case, this embodiment and the above-described embodiment have in common in that after receiving authentication unit information 150 of a memory device 101, authentication unit information 150 is encoded (e.g., encrypted) using private key 310 and provided as a verification value 161. However, this embodiment is different from the above-described embodiment illustrated with respect to FIG. 2 in that the same private key 310 is also provided to host device 201 and host device 201 stores the private key 310 as a key 221.

That is, in the above-described embodiment of FIG. 2, the key (private key 310) used when management entity 300 encodes (e.g., encrypts) the authentication unit information 150 in order to generate verification value 160 is different from the key (public key 320, 220) used when host device 200 decodes verification value 160 of memory device 100. However, there is a difference in the embodiment of FIG. 3 in that private key 310 is used in both cases in this embodiment.

In a process of performing authentication of memory device 101, although providing key 310 by management entity 301 has been illustrated as a method of authenticating memory device 101 using same key 310 in FIG. 3, other solutions are possible. If necessary, key 310 required for the authentication may be provided by the manufacturing company of memory device 101 or the manufacturing company of host device 201 instead of management entity 301.

Although a process in which authentication unit information 150 of the memory device 100, 101 is directly provided to management entity 300, 301 or the like and encoded through a specific key has been described, the process may be modified. Hereinafter, a further embodiment of a memory system will be described with reference to FIG. 4.

Figure 4:
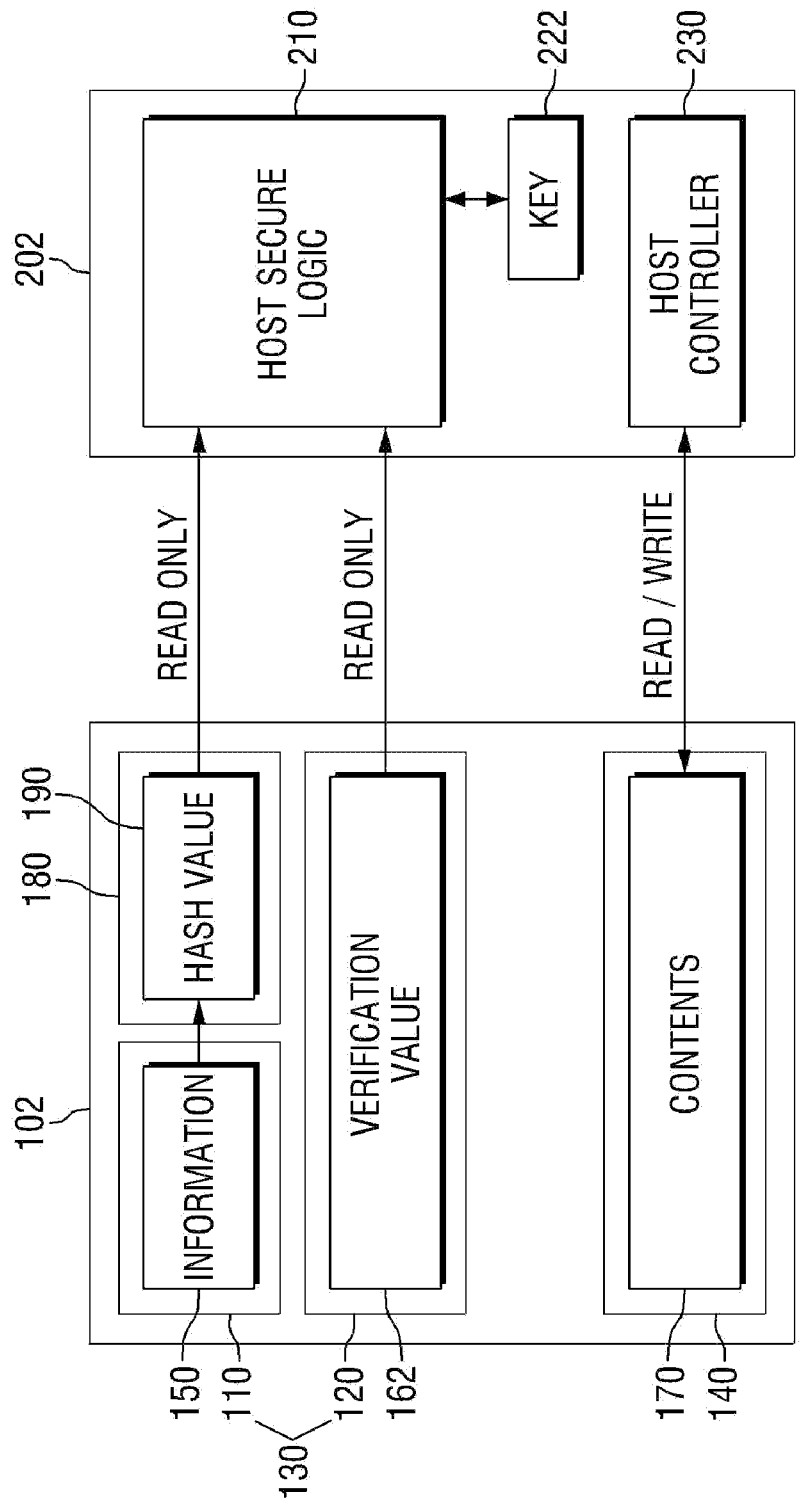
FIG. 4 is a block diagram showing a further embodiment of a memory system.

FIG. 4 is a block diagram showing a further embodiment of a memory system. Similarly to the description above with respect to FIG. 3, the following description will be given focusing on differences from the above-described embodiments.

Referring to FIG. 4, a memory device 102 may further include a hash value generator 180. Hash value generator 180 may generate a hash value 190 by hashing authentication unit information 150 stored in first area 110 through a specific hash function.

When hash value 190 is generated, hash value 190 is provided to the management entity 300, 301 (see FIGS. 2 and 3), and management entity 300, 301 (see FIGS. 2 and 3) encodes (e.g., encrypts) the hash value 190 using private key 310, thereby generating a verification value 162. Verification value 162 is stored in second area 120 of the memory device 102.

Then, in a case where a host device 202 intends to authenticate memory device 102, memory device 102 provides hash value 190 and verification value 162 to host device 202. Further, host device 202 decodes (e.g., decrypts) verification value 162 using a key 222 and determines whether the decoding result matches or is equal to hash value 190, thereby performing authentication of memory device 102. Key 222 owned by host device 202 may be any one of public key 320 (see FIG. 2) and private key 310 (see FIG. 3).

As described above, this embodiment is different from the above-described embodiments in that authentication unit information 150 of the memory device 102 is not exposed to the outside.

Next, yet another embodiment of a memory system will be described with reference to FIG. 5.

Figure 5:
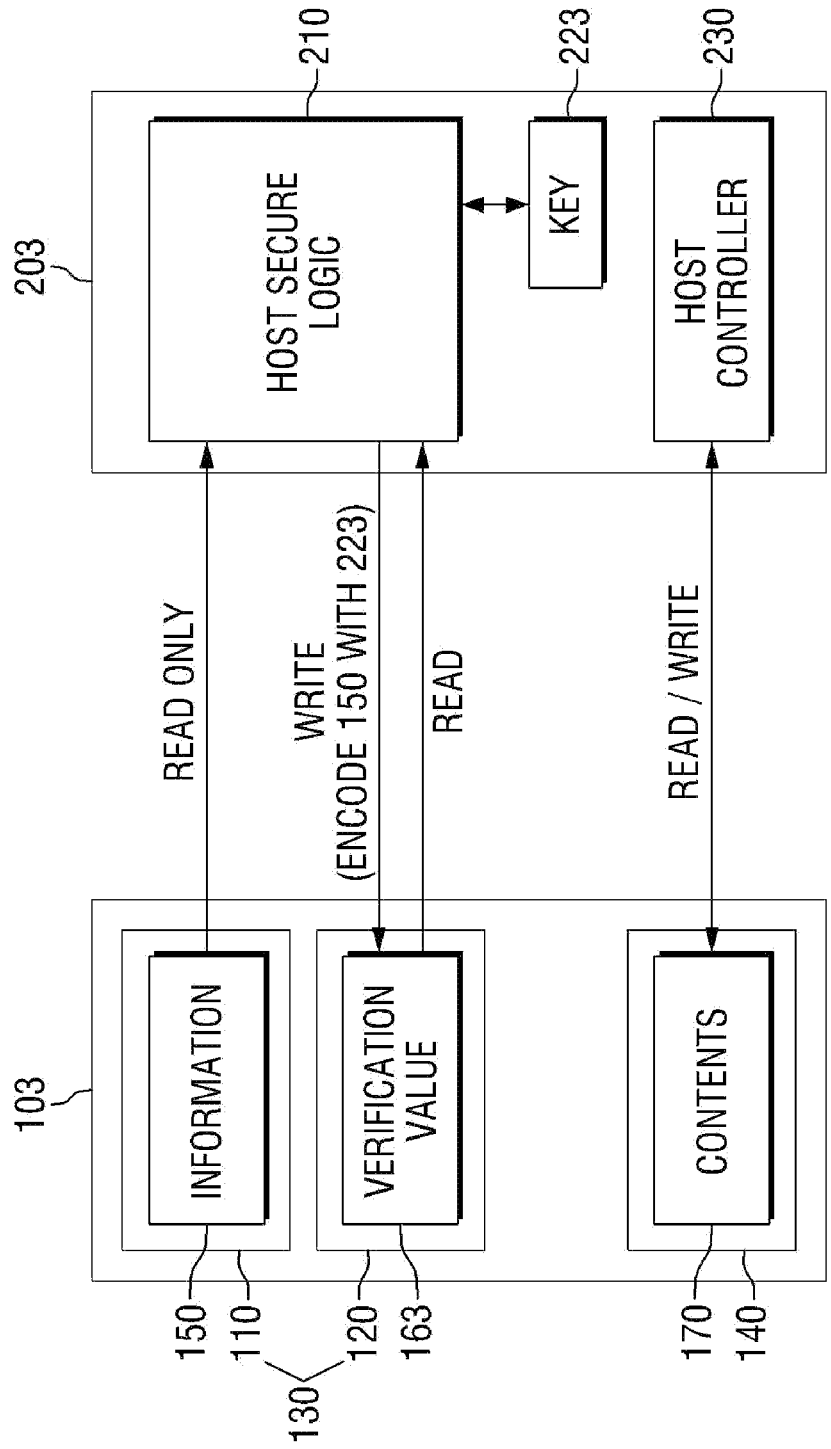
FIG. 5 is a block diagram showing yet another embodiment of a memory system.

FIG. 5 is a block diagram showing yet another embodiment of a memory system. Similarly to the descriptions above with respect to FIGS. 3 and 4, the following description will be given focusing on differences from the above-described embodiments.

Referring to FIG. 5, in this embodiment a host device 203 has only a read authority for first area 110 of a memory device 103, but has both read and write authorities for second area 120 of the memory device 103. That is, host device 203 of this embodiment has an authority of changing a verification value 163 stored in memory device 103. An exemplary case requiring the authentication of memory device 103 using this method is described below.

Let us suppose that a user of host device 203 wants to allow access to contents 170 stored in only memory device 103 authorized by himself/herself. To this end, the user of host device 203 stores verification value 163 capable of being identified by himself/herself in memory device 103 authorized by himself/herself to distinguish memory device 103 from another memory device 103 which has not been authorized.

To this end, host device 203 reads authentication unit information 150 from first area 110 of memory device 103 which has been authorized to be used, and encodes (e.g., encrypts) authentication unit information 150 using a key 223 stored in the host device 203 to thereby generate verification value 163. Further, generated verification value 163 is stored in second area 120 of memory device 103 which has been authorized to be used.

Then, when host device 203 performs authentication of memory device 103, host device 203 reads authentication unit information 150 stored in first area 110 and verification value 163 stored in second area 120 of the memory device 103. In this case, if the memory device 103 is a device which has been authorized by the user, the result of decoding (e.g., decrypting) verification value 163 using key 223 may be the same as or equal to authentication unit information 150. Accordingly, in this case, host device 203 authenticates that memory device 103 is a device which has been authorized to be used. On the other hand, if memory device 103 is a device which has not been authorized to be used, the result of decoding (e.g., decrypting) verification value 163 read from memory device 103 using key 223 may not match or be equal to authentication unit information 150. Accordingly, host device 203 may limit access to the memory device 103.

In this embodiment, key 223 stored in host device 203 and used in the authentication of memory device 103 may be, e.g., a private key. However, in other embodiments the public key infrastructure (PKI) may be used if necessary.

Further, in this embodiment, if host device 203 can freely perform a read operation on verification value 163 stored in second area 120 of memory device 103, verification value 163 may be copied in another memory device 103 which has not been authorized through host device 203. Accordingly, in this embodiment, verification value 163 stored in second area 120 of memory device 103 may be configured to be accessed only when the above-described secure authentication is carried out.

Next, still another embodiment of a memory system will be described with reference to FIG. 6.

Figure 6:
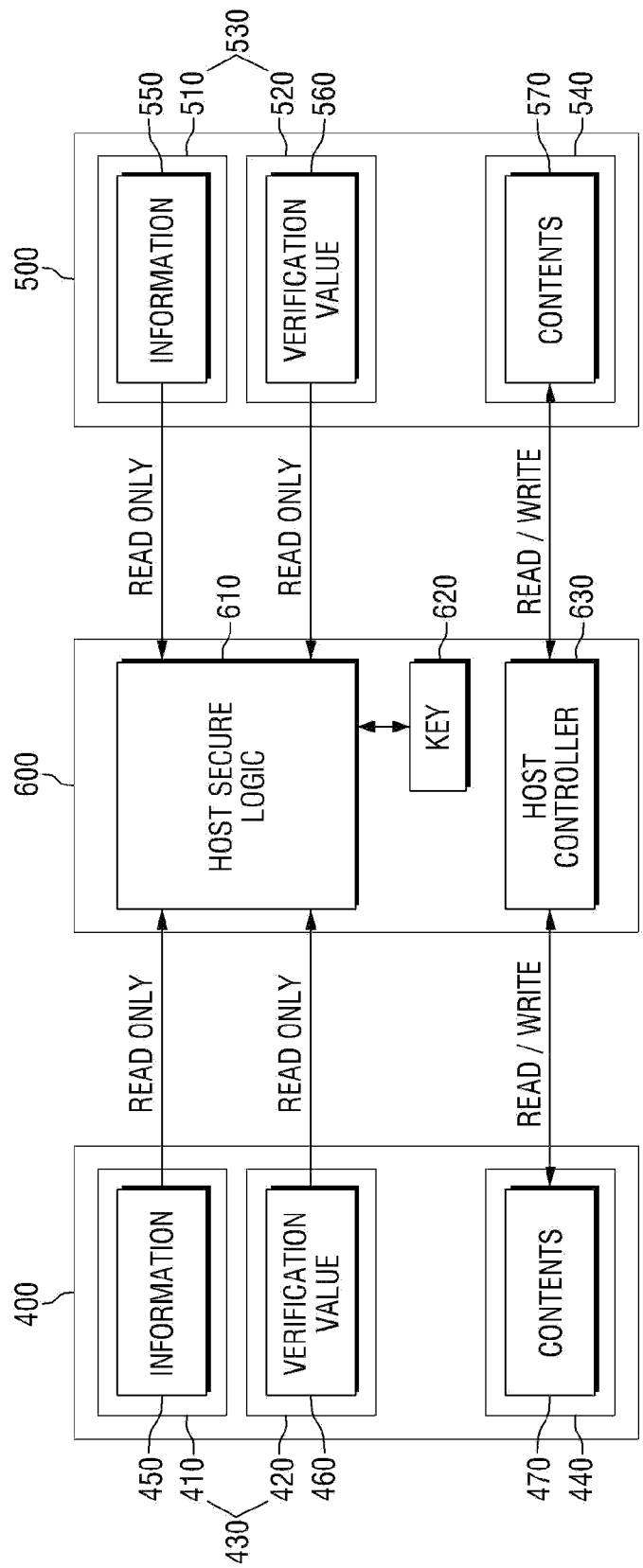
FIG. 6 is a block diagram of still another embodiment of a memory system.

FIG. 6 is a block diagram of still another embodiment of a memory system.

Referring to FIG. 6, memory system may include a first memory device 400, a second memory device 500 and a host device 600.

First memory device 400 may include a first authentication data area 430 and a first contents data area 440. Second memory device 500 may include a second authentication data area 530 and a second contents data area 540.

Specific contents 470 and 570 may be stored in first and second contents data areas 440 and 540, respectively.

First authentication data area 430 may include a first area 410 and a second area 420. First authentication unit information 450 may be stored in first area 410 and a first verification value 460 may be stored in second area 420. Further, second authentication data area 530 may include a third area 510 and a fourth area 520. Second authentication unit information 550 may be stored in third area 510 and a second verification value 560 may be stored in the fourth area 520.

In this embodiment, first to fourth areas 410, 420, 510, 520 may have read-only characteristics. In other words, in this embodiment, host device 600 which accesses first to fourth areas 410, 420, 510, 520 may only read the data stored in the first to fourth areas 410, 420, 510, 520, but may not write or store new data in first to fourth areas 410, 420, 510, 520.

Host device 600 may receive first authentication unit information 450 and first verification value 460 from first memory device 400, and perform secure authentication for first memory device 400 based on whether the result of decoding (e.g., decrypting) first verification value 460 using a key 620 matches or is equal to authentication unit information 450. Further, host device 600 may receive second authentication unit information 550 and second verification value 560 from second memory device 500, and perform secure authentication for second memory device 500 based on whether the result of decoding (e.g., decrypting) second verification value 560 using the key 620 matches or is equal to second authentication unit information 550. Since a detailed description thereof has been made above, and a repeated description is omitted.

In this embodiment, first authentication unit information 450 stored in first memory device 400 may be different from second authentication unit information 550 stored in second memory device 500. For example, if first authentication unit information 450 and second authentication unit information 550 are product identifiers of first memory device 400 and second memory device 500 respectively, first authentication unit information 450 may be different from second authentication unit information 550.

Meanwhile, if necessary, first authentication unit information 450 stored in the memory device 400 may be the same as second memory device 500 stored in the second memory device 500. In this case, if both first memory device 400 and second memory device 500 are legitimate memory devices, first verification value 460 stored in first memory device 400 also may be the same as second verification value 560 stored in second memory device 500.

Although a case where the device 600 has only a read authority for first to fourth areas 410, 420, 510, 520 has been illustrated in FIG. 6, modifications may be made. For example, host device 600 may have only a read authority for first and third areas 410 and 510, but have read and write authorities for second and fourth areas 420 and 520. Of course other similar variations are possible.

With the various embodiments of memory systems as described above, it is possible to authenticate whether a specific memory device is a legitimate memory device for use.

Hereinafter, various embodiments of a memory system and application examples thereof will be described with reference to FIGS. 7 to 9.

Figure 7:
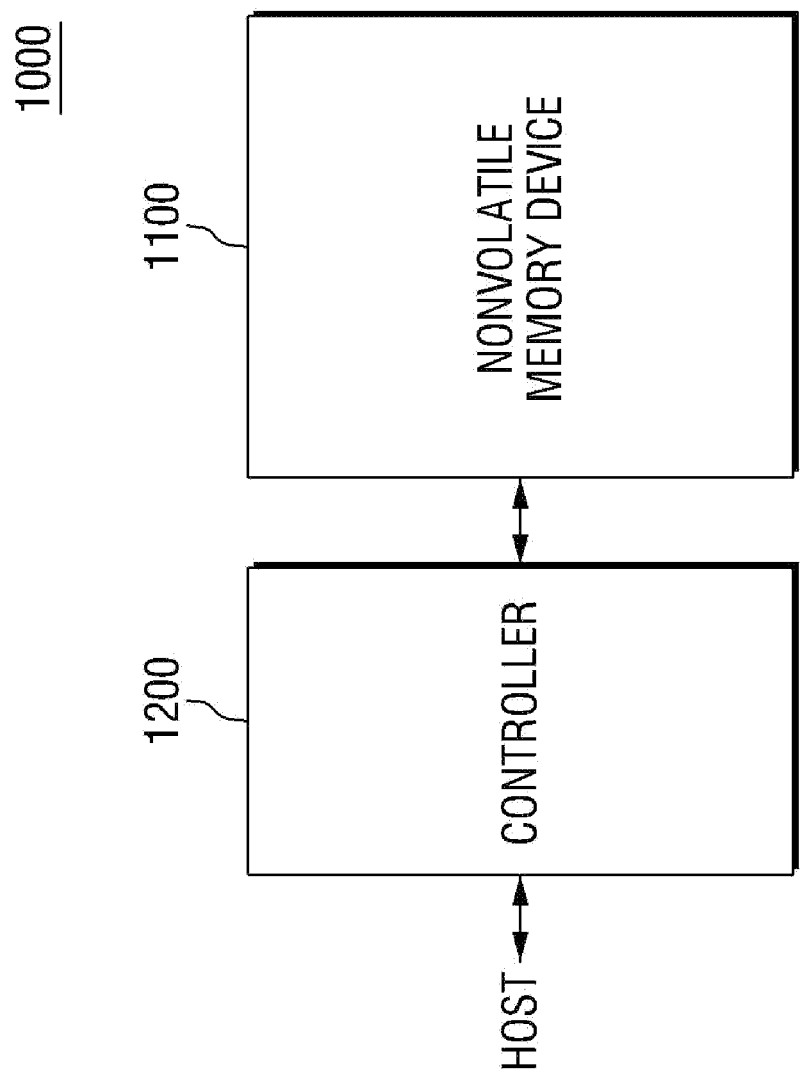
FIG. 7 is a block diagram for explaining various embodiments of a memory system.

FIG. 7 is a block diagram for explaining various embodiments of a memory system. FIG. 8 is a block diagram showing an application example of the memory system of FIG. 7. FIG. 9 is a block diagram showing a computing system including the memory system described with reference to FIG. 8.

Referring to FIG. 7, a memory system 1000 includes a nonvolatile memory device 1100 and a controller 1200.

Nonvolatile memory device 1100 may include at least one memory device capable of perform the above-described authentication operation.

Controller 1200 is connected to a host and nonvolatile memory device 1100. In response to the request of the host, controller 1200 is configured to access nonvolatile memory device 1100. For example, controller 1200 is configured to control the read, write, erase and background operations of nonvolatile memory device 1100. Controller 1200 is configured to provide an interface between nonvolatile memory device 1100 and the host. Controller 1200 is configured to operate a firmware for controlling nonvolatile memory device 1100.

Specifically, controller 1200 may further include well-known components such as a random access memory (RAM), a processing unit, a host interface, and a memory interface. The RAM is used as at least one of an operation memory of the processing unit, a cache memory between nonvolatile memory device 1100 and the host, and a buffer memory between nonvolatile memory device 1100 and the host. The processing unit controls all operations of controller 1200.

The host interface includes a protocol for performing data exchange between the host and controller 1200. For example, controller 1200 is configured to perform communication with the outside (host) through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol, etc. The memory interface interfaces with nonvolatile memory device 1100. For example, the memory interface may include a NAND interface or NOR interface.

Memory system 1000 may be configured to additionally include an error correction block. The error correction block is configured to detect and correct an error of data read from nonvolatile memory device 1100 using an error correction code (ECC). As an example, the error correction block is provided a component of controller 1200. The error correction block may be provided as a component of nonvolatile memory device 1100.

Controller 1200 and nonvolatile memory device 1100 may be integrated as one semiconductor device. Specifically, controller 1200 and nonvolatile memory device 1100 may be integrated as one semiconductor device to constitute a memory card. For example, controller 1200 the nonvolatile memory device 1100 may be integrated as one semiconductor device to constitute a memory card such as a PC card (personal computer memory card international association (PC-MCIA)), a compact flash card (CF), a smart media card (SM, SMC), a memory stick, a multimedia card (MMC, RS-MMC, MMCmicro), a SD card (SD, miniSD, microSD, SDHC), a universal flash storage device (UFS) and the like.

Controller 1200 and nonvolatile memory device 1100 may be integrated as one semiconductor device to constitute a semiconductor drive (solid state drive (SSD)). The semiconductor drive (SSD) includes a storage device configured to store data in a semiconductor memory. In a case where memory system 1000 is used as a semiconductor drive (SSD), an operation speed of the host connected to the memory system 1000 is dramatically improved.

As another example, memory system 1000 is provided as one of various components of an electronic apparatus such as a computer, ultra mobile PC (UMPC), workstation, net-book, personal digital assistants (PDA), portable computer, web tablet, wireless phone, mobile phone, smart phone, e-book, portable multimedia player (PMP), portable game console, navigation device, black box, digital camera, 3-dimensional television, digital audio recorder, digital audio player, digital picture recorder, digital picture player, digital video recorder, digital video player, apparatus capable of transmitting and receiving information in wireless environment, one of various electronic apparatuses constituting the home network, one of various electronic apparatuses constituting the computer network, one of various electronic apparatuses constituting the telematics network, radio frequency identification (RFID) device, and one of various components forming a computing system.

Specifically, nonvolatile memory device 1100 or memory system 1000 may be packaged in various types of packages. For example, nonvolatile memory device 1100 or memory system 1000 may be packaged in a package such as package on package (PoP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flat pack (TQFP), small outline (SOIC), shrink small outline package (SSOP), thin small outline (TSOP), thin quad flat pack (TQFP), system in package (SIP), multi chip package (MCP), wafer-level fabricated package (WFP), wafer-level processed stack package (WSP).

Figure 8:
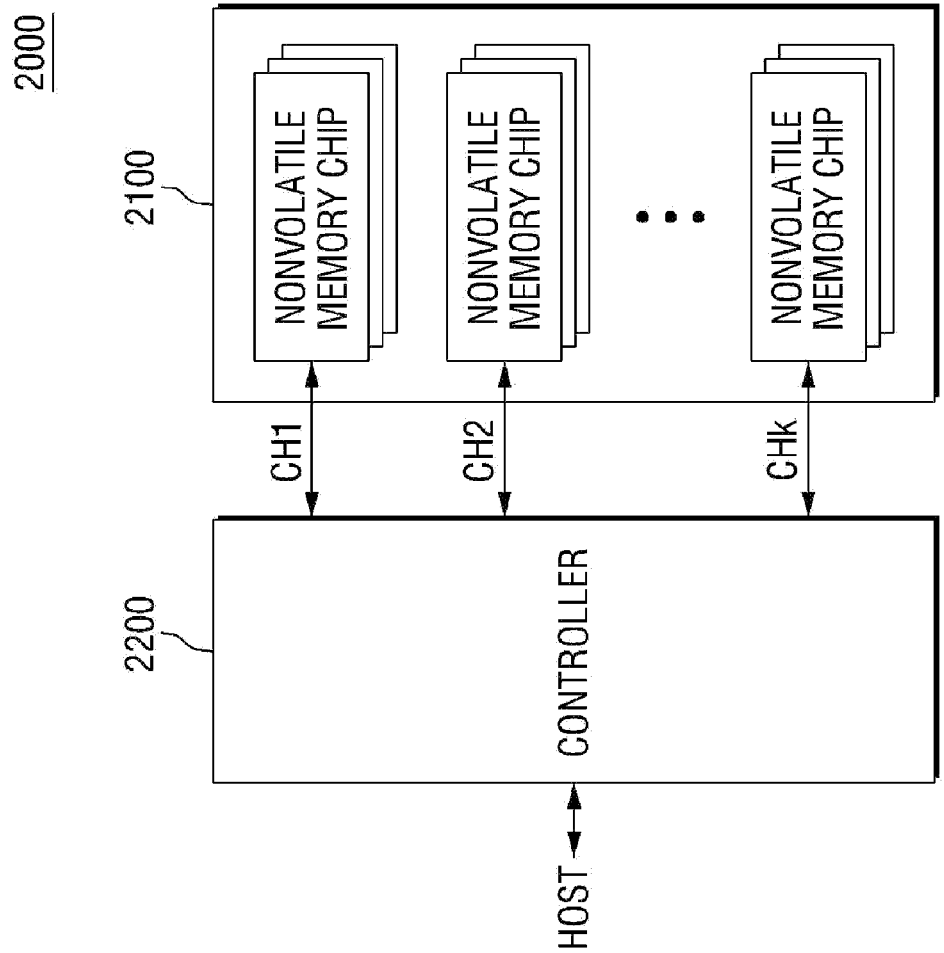
FIG. 8 is a block diagram showing an application example of the memory system of FIG. 7.

Referring to FIG. 8, a memory system 2000 includes a nonvolatile memory device 2100 and a controller 2200. Nonvolatile memory device 2100 includes a plurality of nonvolatile memory chips. The nonvolatile memory chips are classified into a plurality of groups. Each group of the nonvolatile memory chips is configured to perform communication with controller 2200 via one common channel. For example, the nonvolatile memory chips perform communication with controller 2200 via first to k-th channels CH1 to CHk.

A case where a plurality of nonvolatile memory chips are connected to one channel has been illustrated in FIG. 8. However, it can be understood that memory system 2000 may be modified such that one nonvolatile memory chip is connected to one channel.

Figure 9:
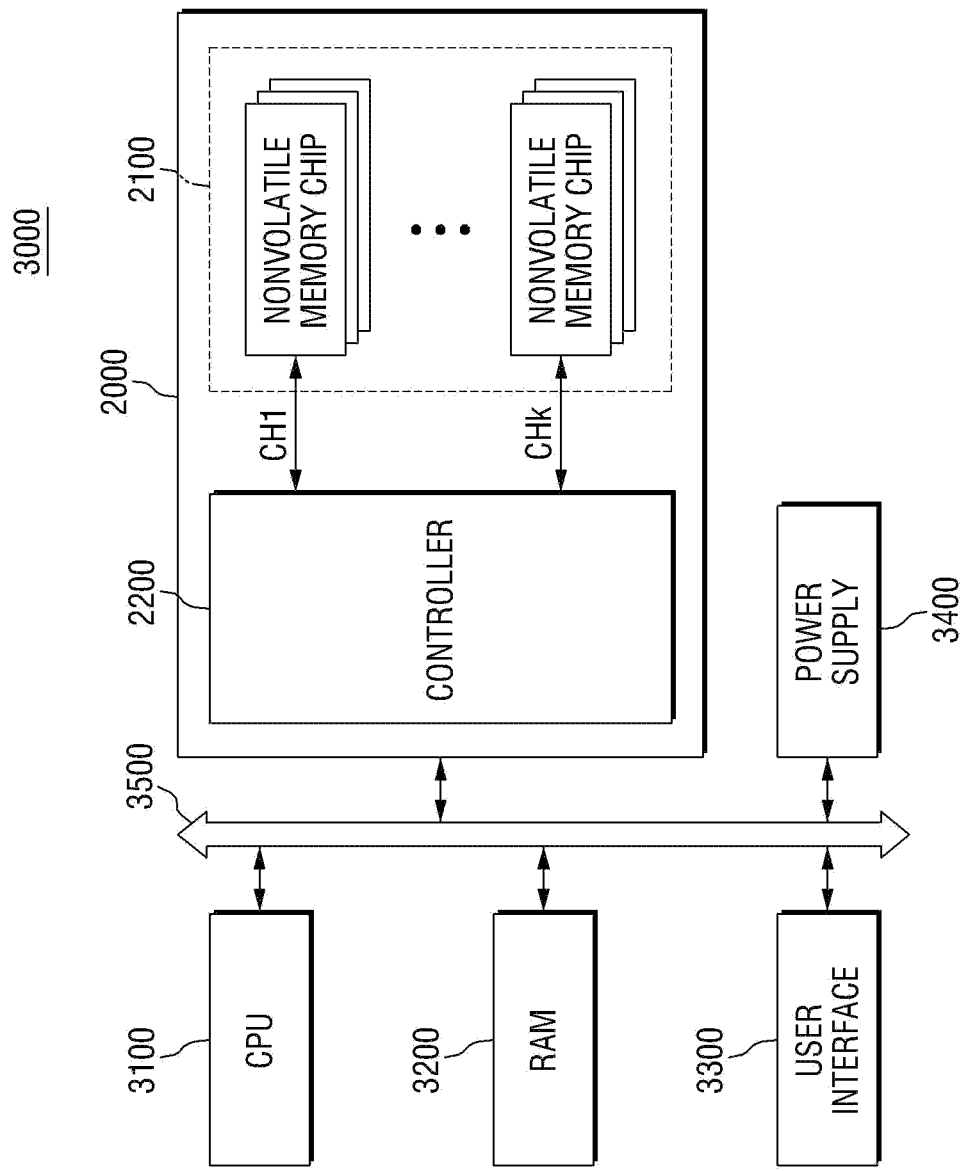
FIG. 9 is a block diagram showing a computing system including the memory system described with reference to FIG. 8.

Referring to FIG. 9, a computing system 3000 includes a central processing unit 3100, a random access memory (RAM) 3200, a user interface 3300, a power supply 3400, and memory system 2000.

Memory system 2000 is electrically connected to central processing unit 3100, RAM 3200, user interface 3300 and power supply 3400 via a system bus 3500. The data provided through user interface 3300 or processed by central processing unit 3100 is stored in memory system 2000.

FIG. 9 illustrates a case where nonvolatile memory device 2100 is connected to system bus 3500 through controller 2200. However, nonvolatile memory device 2100 may be configured to be directly connected to system bus 3500.

A case of providing memory system 2000 described with reference to FIG. 8 has been illustrated in FIG. 9. However, memory system 2000 may be replaced by memory system 1000 described with reference to FIG. 7.

For instance, computing system 3000 may be configured to include all of the memory systems 1000 and 2000 described with reference to FIGS. 7 and 8.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A memory system comprising:
a memory device including an authentication data area storing authentication unit information and a verification value, and a contents data area storing contents; and
a host device configured to receive the authentication unit information and the verification value from the memory device, to determine whether a result of decoding the verification value matches the authentication unit information, to authenticate the memory device when the result of decoding the verification value matches the authentication unit information, and to not authenticate the memory device when the result of decoding the verification value does not match the authentication unit information,
wherein the verification value is a value obtained by encoding the authentication unit information using a first key, wherein the authentication unit information and the verification value are stored in the memory device when the memory device is manufactured, and wherein the host device performs authentication of the memory device based on whether a result of decoding the verification value using a second key matches the authentication unit information, and
wherein the first key is a different key than the second key;
wherein the authentication unit information comprises a product identifier for the memory device, wherein the first key is a private key owned by a management entity, and wherein the verification value is a value generated by the management entity encrypting the product identifier with the private key, and provided by the management entity to a manufacturer of the memory device and stored by the manufacturer in the memory device.

2. The memory system of claim 1, wherein the authentication data area includes a first area storing the authentication unit information and a second area storing the verification value, and wherein the host device has only a read authority for the first and second areas, and does not have any write authority for the first and second areas.

3. The memory system of claim 1, wherein the first key is a private key, and the second key is a public key.

4. The memory system of claim 1, wherein the verification value is a value obtained by encoding a hash value, obtained by hashing the authentication unit information, using the first key.

5. The memory system of claim 1, wherein the authentication data area includes a first area storing the authentication unit information and a second area storing the verification value, and wherein the host device has only a read authority for the first area and does not have any write authority for the first area, and has read and write authorities for the second area.

6. The memory system of claim 5, wherein the host device encodes the authentication unit information using the first key stored in the host device, and stores the encoded information as the verification value in the second area of the memory device.

7. The memory system of claim 6, wherein the first key is a private key.

8. The memory system of claim 5, wherein the host device performs authentication of the memory device based on whether a result of decoding the verification value using the first key stored in the host device matches the authentication unit information.

9. The memory system of claim 8, wherein the verification value is provided from the memory device to the host device only when the secure authentication is performed.

10. A memory system comprising:
a first memory device storing first authentication unit information and a first verification value;
a second memory device storing second authentication unit information and a second verification value; and
a host device configured to receive the first authentication unit information and the first verification value from the first memory device, and to perform authentication of the first memory device based on whether a result of decoding the first verification value matches the first authentication unit information, and further configured to receive the second authentication unit information and the second verification value from the second memory device, and to perform secure authentication of the second memory device based on whether a result of decoding the second verification value matches the second authentication unit information,
wherein the first verification value is a value obtained by encoding the first authentication unit information using a first key, wherein the first authentication unit information and the first verification value are stored in the first memory device when the first memory device is manufactured, and wherein the host device performs authentication of the first memory device based on whether a result of decoding the first verification value using a second key matches the first authentication unit information, and
wherein the first key is a different key than the second key;
wherein the first authentication unit information comprises a product identifier for the first memory device, wherein the first key is a private key owned by a management entity, and wherein the first verification value is a value generated by the management entity encrypting the product identifier with the private key, and provided by the management entity to a manufacturer of the first memory device and stored by the manufacturer in the first memory device.

11. The memory system of claim 10, wherein the first authentication unit information and the second authentication unit information are different values from each other.

12. The memory system of claim 10, wherein the first authentication unit information and the second authentication unit information are the same values as each other.

13. An apparatus, comprising:
a host device: and
a memory device having:
a contents data storage area storing contents, and
an authentication data storage area for authenticating the contents, the authentication data storage area including:
a first area storing therein authentication unit data, and
a second area storing a verification value obtained by encoding at least one of: (1) the authentication unit data, and (2) a hashed value obtained by hashing the authentication unit using a first key, wherein the authentication unit information and the verification value are stored in the memory device when the memory device is manufactured,
wherein the host device performs authentication of the memory device based on whether a result of decoding the verification value using a second key matches the authentication unit data, wherein the first key is a different key than the second key;
wherein the authentication unit data comprises a product identifier for the memory device, wherein the first key is a private key owned by a management entity, and wherein the verification value is a value generated by the management entity encrypting the product identifier with the private key, and provided by the management entity to a manufacturer of the memory device and stored by the manufacturer in the memory device.

14. The apparatus of claim 13, wherein the host device is configured to consume the contents of the contents data storage area only when the comparison produces a match.

15. The apparatus of claim 13, wherein the host device has only read access to the authentication data storage area, and does not have any write access for the authentication storage area.

16. The apparatus of claim 13, wherein the host device stores a key and has only read access to the first area, and does not have any write authority for the first area, but has read and write access to the second area, and wherein the host device is configured to:
  receive the one of: (1) the authentication unit data, and (2) a hashed value obtained by hashing the authentication unit data;
  encode the one of: (1) the authentication unit data, and (2) the hashed value obtained by hashing the authentication unit data, using the key; and
  to store the encoded one: of: (1) the authentication unit data, and (2) the hashed value obtained by hashing the authentication unit data.

* * * * *